Patented Mar. 26, 1940

2,194,927

UNITED STATES PATENT OFFICE 2,194,927

AZO COMPOUND

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application December 31, 1937, Serial No. 182,803

8 Claims. (Cl. 260—198)

This invention relates to new aryl compounds, and especially to compounds made by coupling diazotized dinitroamino-benzotrifluoride compounds to azo dye coupling components and to processes of producing the same. More particularly the invention relates to such compounds in which the trifluoromethyl group of the azo component is in a position ortho or para to the azo bridge and the nitro and trifluoromethyl groups are in positions 2, 4 and 6 to the azo bridge.

Various azo colors having as the diazo base a benzene nucleus which is substituted by negative groups have been made but some of them do not give deep shades while others which give relatively deep shades are not entirely satisfactory with respect to their stability to alkalis, such as sodium carbonate. It is therefore desirable to provide colors having improved depth of shade and satisfactory fastness to alkalis and improved brightness. It is also desirable to provide azo dyes which have good affinity for a variety of textiles, and particularly for textiles of cellulose esters and ethers, such as acetate silk, and which will give bright shades of blue and green.

It is among the objects of the invention to provide monazo colors which are represented generally by the formula

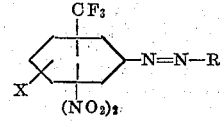

in which the azo group is ortho or para to at least two of the groups consisting of —NO₂ and —CF₃ and either or both of the otherwise unsubstituted positions of the benzene nucleus as indicated in the above formula by X may be substituted by alkoxy or trifluoromethyl or by both of said groups, which substitutions may be alike or different in the additionally disubstituted compounds, and R is the residue of any azo dye coupling component. Another object of the invention is to provide monazo compounds having deep shades and good mass tone. Another object of the invention is to provide monazo compounds which are valuable for dyeing textiles, particularly wool, silk, cellulose esters, cellulose ethers and similar textile materials and which give dyeings in deep shades. Still other objects of the invention will be apparent from the following description.

The objects of the invention are attained generally by diazotizing a dinitro-(trifluoromethyl)-aniline represented by the formula

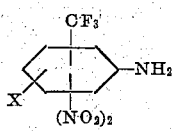

in which the substituted groups are in the positions and have the values hereinbefore described. The diazotized amine is then coupled to any azo dye coupling component, preferably in acid medium by methods well known in the art.

The invention will be more fully set forth in the following more detailed description which includes examples that are given as illustrative embodiments of the invention and not as limitations thereof.

Example 1

To a solution of 7 parts sodium nitrite in 180 parts concentrated sulfuric acid were added 25 parts of 2-amino-3-5-dinitro benzotrifluoride. After ½ hour 100 parts glacial acetic acid were added and the solution was allowed to stand another half hour. This diazo solution containing 2-trifluoromethyl-4-6-dinitro-diazobenzene-acid sulfate was slowly added to an acid solution of 20 parts of N-diethanol m-toluidine and 60 parts 2-normal hydrochloric acid in 200 parts water with enough ice to keep the mixture cold. The mineral acidity was neutralized with sodium hydroxide and the insoluble color was filtered off and dried. The product of coupling was insoluble in water, but soluble in gasoline giving a red violet color, soluble in ethyl acetate giving a violet color and soluble in pyridine giving a blue color. On dilution of the pyridine solution with water a violet dispersion was obtained. The compound is represented by the formula:

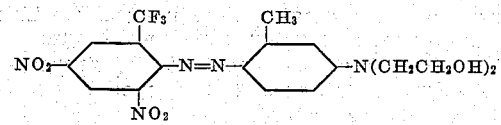

A finely divided dispersion of the compound was made in water, the dispersion was heated to 75° C. and acetate silk was dyed therein. The silk was dyed a violet color.

Example 2

By using 33 parts of N-methyl N-sorbityl cresidine instead of 20 parts of N-diethanol m-toluidine as in Example 1, a product of coupling was obtained which dyed acetate silk from a dispersion of the compound in hot water a bluer shade of violet. The dyeing was slightly bluer than the dye obtained by diazoting 6 brom 2.4-dinitro aniline and coupling with N-methyl N-sorbityl cresidine. The compound is represented by the following formula:

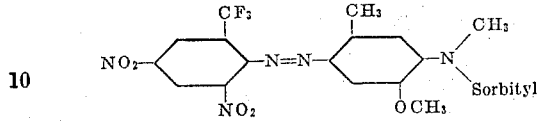

Example 3

By using 22 parts of 1-ethanol-amino-5-naphthol instead of 20 parts of N-diethanol m-toluidine as in Example 1 a coupling product was obtained which was insoluble in water and was soluble in pyridine giving a green color. Its solution in ethyl acetate was blue green, and in benzene it was blue. The pyridine solution when diluted with water gave a blue green dispersion which dyed acetate silk a bluish green. The compound is represented by the formula

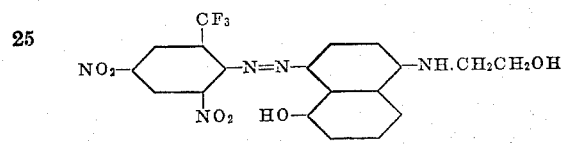

Example 4

One part of the dye obtained in Example 3 was dissolved in 20 parts of concentrated sulfuric acid at 25° C. After one hour this solution was poured onto 80 parts of ice and the precipitate was filtered off. The precipitate was stirred into 20 parts of water and dissolved by making the mixture slightly alkaline with sodium carbonate. The product was salted out by adding 5 parts of salt. The compound is represented by the formula

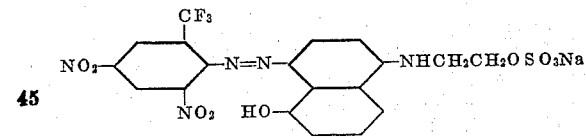

This product was soluble in water giving a green color. A dye bath was made by dissolving a portion of the product and some common salt or glauber salt in water. The bath dyed acetate silk a strong green color of good dischargeability and good fastness to washing. Natural silk was also dyed green in a similar dyebath.

Example 5

A solution of the diazo compound prepared as described in Example 1 was slowly added to an ice cold alkaline solution of 36 parts of H-acid which was kept alkaline by the simultaneous addition of 10 normal sodium hydroxide. The product obtained dyed silk and wool from an acetic acid bath a deep black. Weak dyeings on silk were a neutral gray. The compound is represented by the formula:

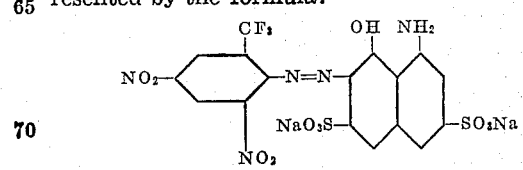

Example 6

10 parts of 3:5-dinitro-2-amino-benzotrifluoride were dissolved in glacial acetic acid (40 parts) and the solution was added to 70 parts of sulfuric acid (96%) containing 2.8 parts of sodium nitrite. The resulting solution was allowed to stand for 30 minutes. This diazo solution was slowly added to a mixture obtained by dissolving 6.0 parts of beta-naphthol in 50 parts of water containing sufficient sodium hydroxide to effect solution, and then making the solution acid to litmus with acetic acid. Ice was kept in the coupling mixture during the addition of the diazo solution. An insoluble reddish orange precipitate was formed which was removed by filtration, washed with water, and dried at room temperature. Portions of it were dissolved in pyridine, benzene and heptane, giving orange to reddish orange colored solutions. The product is represented by the formula

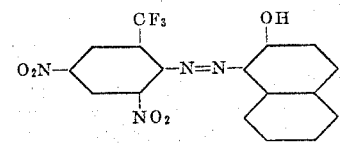

The following colored products were made by adding portions of a diazo solution similar to that described in Example 6 to slightly alkaline solutions of various coupling components. The solutions were, in general, acid in reaction after the completion of the couplings.

| Example | Coupling component | Description of the azo compound |
|---|---|---|
| 7 | 1-phenyl-3-methyl-5-pyrazolone. | Orange colored precipitate. Caustic soda solution was red in color. |
| 8 | Resorcin | Orange colored precipitate. Caustic soda solution was blue in color. |
| 9 | 2 - hydroxy - 3 - naphthoic acid. | Reddish orange precipitate. Caustic soda solution was blue in color. Barium lake was blue in color. |
| 10 | Anilide of 2-hydroxy-3-naphthoic acid. | Reddish orange precipitate. Caustic soda solution was blue in color. |
| 11 | Salicylic acid | Yellow precipitate. Caustic soda solution was blue. Barium lake was blue in color. |
| 12 | Acetoacetanilide | Yellow precipitate. Caustic soda solution was orange in color. |

Example 13

A diazo solution similar to that described in Example 6 was coupled in the presence of sodium acetate to phenyl J-acid. The resulting azo compound was blue in color.

The dinitro-amino-benzotrifluoride used in the above examples may be replaced by 4-amino-3,5 dinitro-benzotrifluoride, or by any dinitro-amino-benzotrifluoride which may be made by the process which consists in the ammonolysis of a dinitro-halo-benzotrifluoride such as those obtained by nitration of an ortho-halo or para-halo benzotrifluoride. Other substituent groups such as halogen, methoxy and trifluoromethyl groups may be present in the nucleus.

The compounds which are free from sulfonic acid groups are generally quite insoluble in water. Many of them have good affinity for cellulose ester, cellulose ether and similar fibres and can be used advantageously to dye such fibres by making fine dispersions of the compounds in dye baths. When the azo compound contains at least one sulfonic acid group the alkali metal salts are generally soluble and can be used for dyeing wool and other animal fibres.

The described diazotized bases couple readily with azo dye coupling components in acid, neutral and alkaline media but acid coupling is ordinarily preferred. Any azo dye coupling component can be used. Among such components are the amino and hydroxy substituted derivatives of benzene, naphthalene and quinoline, and straight chain carbocyclic and heterocyclic compounds which contain an active methylene group. As illustrations are mentioned aniline, its homologues, m-amino phenols and amino-phenol ethers; alpha and beta-naphthols, alpha and beta-naphthylamines, amino-naphthols and the sulfonic acid and carboxylic acid derivatives of said naphthalene compounds; the arylides of hydroxy-naphthoic acid compounds, such as the alpha-naphthalide of beta-hydroxy-naphthoic acid, and their derivatives; the acetoacet arylides and their derivatives; such as acetoacet anilide; pyrazolones, such as 1-phenyl-3-methyl-5-pyrazolone and 1-(2'-chloro-5'-sulfo-phenyl)-5-pyrazolone-3-carboxylic acid ethyl ester; hydroxy quinolines, such as 2-4-dihydroxy-quinoline and N-methyl-4-hydroxy-2-quinolone; hydrogenated quinolines such as py-tetra-hydro-quinoline and py-tetra-hydrobenzoquinoline.

Amino and hydroxy compounds of benzene and naphthalene which are substituted by other groups or are unsubstituted give particularly good results as coupling components, but others can be used. The aryl amino derivatives which are N-substituted by one or two aliphatic groups having 1 to 6 carbon atoms are preferred for acetate silk dyes. The aryl nuclei of the coupling components may be substituted once or more than once by the substituents commonly present in azo coupling components.

In diazotizing the amino bases hereinbefore described, it is not essential to adhere to the exact conditions set forth in the examples since other procedures known to those skilled in the art for the diazotization of weakly basic amines can be used. Since the diazo compounds are usually prepared in strong acid solutions the couplings are conveniently made in acid solutions, but they can be made in alkaline solutions or in solutions in which the mineral acidity is neutralized.

In general the dyes of the present invention give deeper shades than can be obtained from azo compounds in which dinitro aniline and dinitro halo anilines are similarly used as the diazo bases, especially in monazo dyes in blue shades. As compared to monazo dyes in which 2-4-6-trinitro aniline is used as the amino base, the dyes of the invention have greater stability toward bases, such as sodium carbonate.

Since from the foregoing description of the invention it will be apparent to those skilled in the art that various other embodiments of the invention may be made without departing from the spirit and scope thereof, it is to be understood that the invention is not restricted to the specific illustrations thereof herein set forth.

We claim:

1. A monazo dye consisting of the radical of a diazotized dinitro-amino-benzotrifluoride in which the nitro and trifluoromethyl groups are in meta positions to each other, said radical being connected with the radical of an azo dye coupling component by an azo bridge.

2. A monazo compound represented by the formula

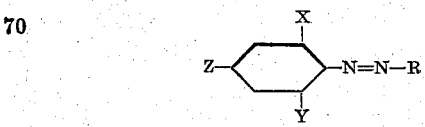

in which one of the group X, Y and Z is trifluoromethyl and the other two symbols of the group are nitro, and R is the radical of an azo dye coupling component.

3. A monazo compound represented by the formula

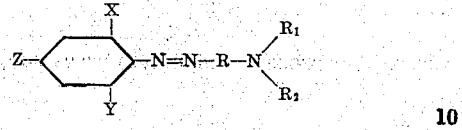

in which one of the group X, Y and Z is trifluoromethyl and the other two symbols of the group are nitro, R is the radical of an arylamine of the group consisting of the benzene and naphthalene series having a free coupling position

is one of a group consisting of secondary and tertiary amine groups wherein $R_1$ is one of a group consisting of hydrogen, monohydroxy alkyl and alkyl, and $R_2$ is one of a group consisting of alkyl, monohydroxy alkyl, polyhydroxy alkyl and sulfatoalkyl, said alkyl groups having 1 to 6 carbons.

4. A monazo compound represented by the formula

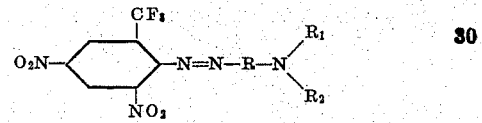

in which R is the radical of an arylamine of the group consisting of the benzene and naphthalene series and

is one of a group consisting of secondary and tertiary amine groups wherein $R_1$ is one of a group consisting of hydrogen, monohydroxy alkyl and alkyl, and $R_2$ is one of a group consisting of alkyl, monohydroxy alkyl, polyhydroxy alkyl and sulfatoalkyl, said alkyl groups having 1 to 6 carbons.

5. A monazo compound represented by the formula

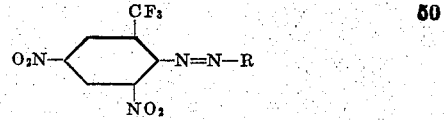

in which R is the radical of a 1-(N-substituted-amino)-5-naphthol coupled in the para position to the amine group wherein the N-substituted group is

in which $R_1$ is one of a group consisting of hydrogen, monohydroxy alkyl and alkyl, and $R_2$ is one of a group consisting of alkyl, monohydroxy alkyl, polyhydroxy alkyl and sulfatoalkyl, said alkyl groups having 1 to 6 carbons.

6. The compound represented by the formula

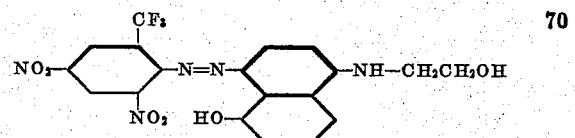

7. The compound represented by the formula

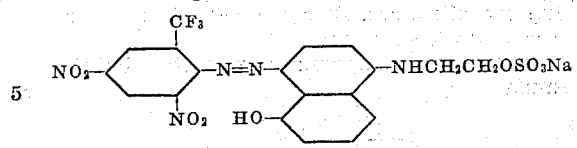

8. The process which comprises coupling with an azo dye coupling component a diazotized dinitro-amino-benzotrifluoride in which the nitro and the trifluoromethyl groups are in meta positions to each other, neutralizing the coupling medium and separating therefrom the product of coupling.

HERBERT W. DAUDT.
HAROLD E. WOODWARD.